United States Patent [19]

Baniel

[11] Patent Number: 5,350,433
[45] Date of Patent: Sep. 27, 1994

[54] METHOD OF MANUFACTURING A CYLINDRICAL PART FROM GLASS, ESPECIALLY FROM FLUORINATED GLASS BY MAINTAINING A THIN GASEOUS FILM AROUND THE CYLINDER

[75] Inventor: Pascal Baniel, Ris-Orangis, France

[73] Assignee: Alcatel N.V., Amsterdam, Netherlands

[21] Appl. No.: 9,643

[22] Filed: Jan. 27, 1993

[30] Foreign Application Priority Data

Jan. 28, 1992 [FR] France ............... 92 00867

[51] Int. Cl.⁵ ............................... C03B 19/09
[52] U.S. Cl. ............................. 65/388; 65/25.1;
65/374.15; 65/182.2; 65/DIG. 16; 65/17.3;
65/413; 65/412
[58] Field of Search ............ 65/374.15, 25.1, 169,
65/182.2, 3.11, 18.1, 18.4, DIG. 16

[56] References Cited

U.S. PATENT DOCUMENTS 3,298,808 1/1967 Macks ................. 65/25.1
4,617,041 10/1986 Meerman ............. 65/18.1

FOREIGN PATENT DOCUMENTS 0406796  1/1991 European Pat. Off. .
0406796A1 1/1991 European Pat. Off. .
4821347  9/1964 Japan ................. 65/25.1
48-22977 7/1973 Japan ................. 65/25.1
56-009230 1/1981 Japan .
57-166328 10/1982 Japan .

OTHER PUBLICATIONS

Webster's Third New International Dictionary, Merriam-Webster, Inc., Springfield, MA (1981), p. 574.

Primary Examiner—Peter Chin
Assistant Examiner—John Hoffmann
Attorney, Agent, or Firm—Robbins, Berliner & Carson

[57] ABSTRACT

In a method of manufacturing a cylindrical part from glass, especially but not exclusively fluorinated glass, a vertical cylindrical cavity is lined with a porous material and its inside dimensions are a few tens of microns greater than those of the part. A cylindrical pedestal constituting a support for the part slides in the cavity. An initial seed mass constituted from the glass is provided on the pedestal. The seed mass is heated until it melts and a gas is injected permanently into the porous material in order to maintain between them and the molten seed mass a layer of gas a few tens of microns thick to prevent any contact. The molten seed mass is fed continuously from the top of the cavity with the powder constituents of the glass and the pedestal is lowered as the cylindrical part is formed from the seed mass.

13 Claims, 7 Drawing Sheets

METHOD OF MANUFACTURING A CYLINDRICAL PART FROM GLASS, ESPECIALLY FROM FLUORINATED GLASS BY MAINTAINING A THIN GASEOUS FILM AROUND THE CYLINDER

BACKGROUND OF THE INVENTION

1. Field of the Invention

The present invention concerns a method of manufacturing a cylindrical glass part such as a rod or a tube, for example a method of manufacturing a cylindrical optical fiber preform.

2. Description of the Prior Art

Some glasses, including fluorinated glasses, are difficult to process and in particular ally physical contact with this kind of glass during shaping introduces impurities and results in the formation of crystallites or microcrystals; all such defects compromise the optical quality of the glass.

Given these difficulties, conventional glassmaking techniques are not able to produce in a single operation a cylindrical part which has the following properties simultaneously:

excellent optical quality, because the glass constituting it is homogeneous,
perfect surface state,
extremely well controlled inside and outside diameters (accurate to within 50 μm or better),
lengths exceeding 100 mm.

French patent FR-A-2 649 392 discloses a technique for producing a fluorinated glass rod using gas film confinement.

This technique has not previously been applied to the manufacture of a tube because of specific difficulties due to the much more complex shape.

An object of the present invention is to adapt this technique to the manufacture of a tube, for example a fluorinated glass tube.

Another object of the present invention is to improve this technique in the case of manufacturing a rod.

SUMMARY OF THE INVENTION

To this end the present invention consists in a method of manufacturing a cylindrical part from glass, especially but not exclusively fluorinated glass, in which method:

a vertical cylindrical cavity is lined with a porous material and its inside dimensions are a few tens of microns greater than those of said part,
a cylindrical pedestal constituting a support for said part is adapted to slide in said cavity,
an initial seed mass constituted from said glass is provided on said pedestal,
said seed mass is heated until it melts and a gas is injected permanently into said porous material in order to maintain between them and said molten seed mass a layer of gas a few tens of microns thick to prevent any contact,
said molten seed mass is fed continuously from the top of said cavity with the powder constituents of said glass, and
said pedestal is lowered as said cylindrical part is formed from said seed mass.

Highly advantageously:

the pedestal is a hollow cylindrical body closed at the bottom by a piston,
the pedestal initially contains a solid glass charge adapted to form the seed mass, and
the molten seed mass is extracted progressively from the pedestal by pushing the piston upwards.

According to a further feature of the invention the pedestal slides in the cavity with a layer of gas between them.

The gas pressure in the porous material is preferably controlled to maintain in the cavity in the steady state a column of molten glass which is stable and of constant height.

The part being formed is preferably surmounted by a column of molten glass and the interface between them at the vitreous transition temperature is at the level of the base of the membranes.

The porous linings are advantageously made from graphite with a DARCY permeability in the order of $10^{-15}$ m$^2$.

Also, all surfaces of the pedestal and the piston may be covered with a thin pyrocarbon layer.

If the cylindrical part is a tube:

the cavity is tubular and lined with coaxial porous membranes, and
the pedestal is annular.

To simplify the implementing device the membranes are then the same thickness and the pressures applied to the inside and outside of the tube being forced are equal.

If the cylindrical part is a rod:

the cavity is tubular and hollow, and
the pedestal is tubular.

The present invention also consists in a tube and a rod manufactured by the above methods; this tube and this rod have over their entire length tolerances in respect of their inside and outside diameters of 50 μm or better.

The invention further consists in an optical fiber preform, especially but not exclusively made from fluorinated glass, comprising a core rod and a cladding tube manufactured in accordance with the present invention.

The mechanical properties of cylindrical parts manufactured by the method of the invention are better than those of parts manufactured heretofore which were subject to microfractures due to inclusions and to thermal stresses resulting from contact with the walls of the mold or the crucible used to manufacture them.

Also, the chemical cleanliness of the raw surface of cylindrical parts in accordance with the invention indicates very good coating adhesion properties, for example protective or active thin films; plasma or laser ablation deposition techniques may be used, for example.

The quality of the interior surface of a tube in accordance with the invention indicates beneficial applications in the direct manufacture of hollow core optical fibers, for transmitting radiation at the wavelength of 10.6 μm, for example. The quality of the internal surface is of overriding importance for this type of fiber.

Other features and advantages of the present invention will emerge from the following description of embodiments thereof given by way of non-limiting illustrative example only.

DETAILED DESCRIPTION OF THE INVENTION

Figure 1:
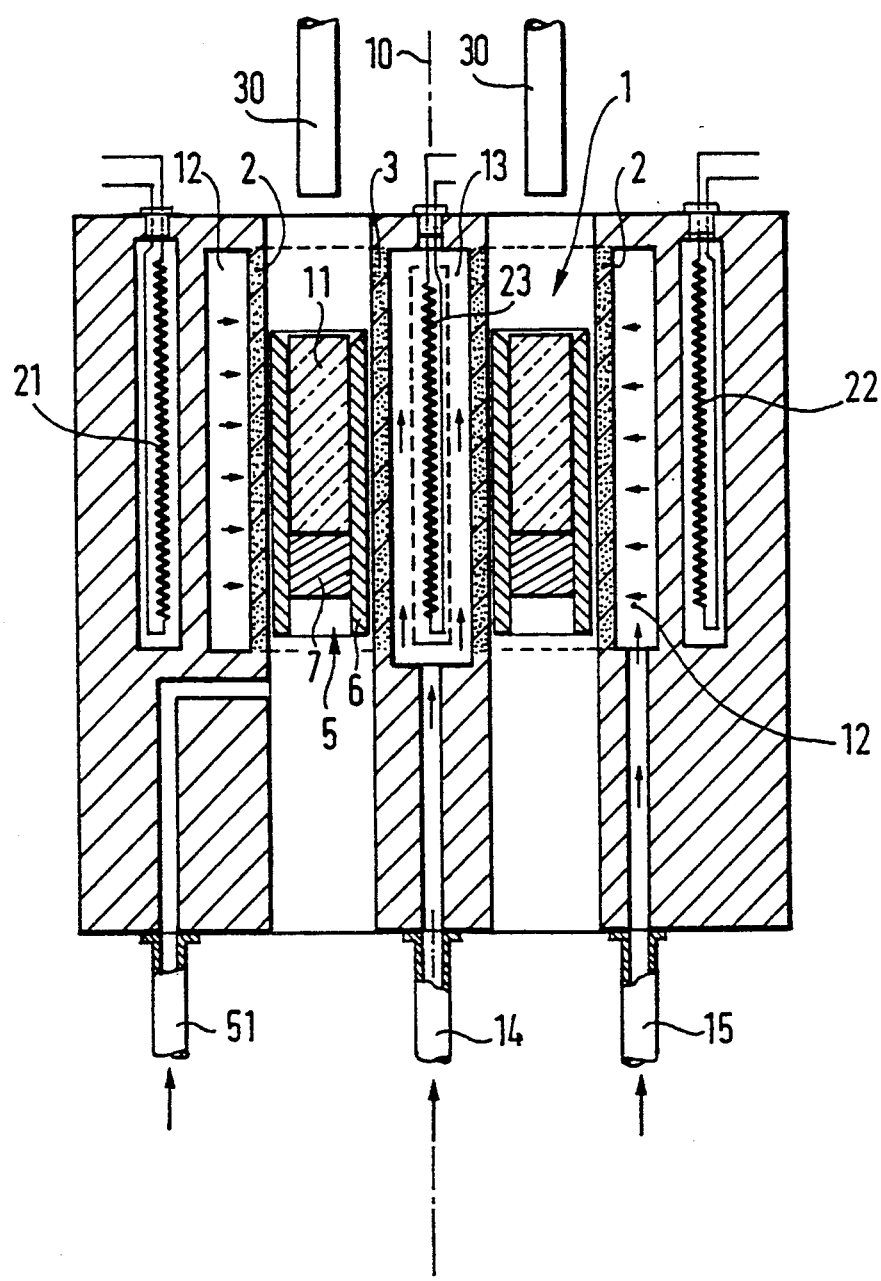
FIGS. 1 through 5 are highly schematic representations of one device utilizing the method in accordance with the invention and show various phrases in the manufacture of a fluorinated glass tube.

In all the figures common or similar parts are identified by the same reference number.

The manufacture of a tube will be described first, for example a cladding tube for an optical fiber preform made from a glass whose composition (in molar percent) is 53 ZrF$_4$-20 BaF$_2$-4 LaF$_3$-4 AlF$_3$-19 NaF.

The length of the tube is 10 cm, its inside diameter is 15 mm and its outside diameter is 30 mm.

FIGS. 1 through 5 are schematic representations of a device comprising a vertical tubular cavity 1 which is a body of revolution about an axis 10 and covered over part of its height by two coaxial porous linings 2 and 3 made from graphite whose DARCY permeability is in the order of $10^{-15}$ m$^2$. This material can be obtained in a highly pure state and is inert with respect to fluorinated substances, especially if it is covered with a thin layer (0.1 μm thick, for example) of pyrocarbon produced at high temperature, for example by pyrolysis of methane. The linings 2 and 3 are therefore not degraded despite a highly corrosive atmosphere due to the presence of fluorinated substances.

The inside diameter of the lining 2 is 30.05 mm and the outside diameter of the lining 3 is 14.95 mm. The tolerance in respect of each diameter is 0.01 mm. Both membranes are preferably the same thickness, equal to 2 mm in this example.

The lower part of the tubular cavity 1 not covered with the linings 2 and 3 has the same dimensions as these linings with the same tolerance.

In order to feed them with a flow of gas the membranes 2 and 3 are associated with two coaxial hollow bodies 12 and 13 with gas inlets 14 and 15 for gases at respective pressures $P_1$ and $P_2$.

Heating cartridges 21, 22, 23 which are adjustable in height are provided inside and outside the tubular cavity 1.

An annular pedestal 5 which is also a body of revolution about the axis 10 is adapted to slide within the cavity 1. It is in the form of an annular cylindrical hollow body 6 closed at the bottom by an annular piston 7. All the internal surfaces of the pedestal 5 which may come into contact with the fluorinated substances are covered with a thin pyrocarbon layer, which has the advantages previously mentioned.

Means (not shown) are provided for pushing the piston 7 upwards and the pedestal 5 downwards.

Finally, means 30 are schematically shown for continuously distributing to the upper part of the cavity 1 a powder made up of the constituents of the glass of the cylindrical part to be manufactured. A powder flowrate regulator system (not shown, but familiar to the man skilled in the art) may additionally be provided.

All of the device as described above is advantageously installed in an enclosure (not shown) schematically sealed from the atmosphere and into which a neutral gas such as argon or helium is introduced. If the cylindrical parts manufactured are made from fluorinated glass the neutral gas may be diluted with a fluorinated gas such as sulfur hexafluoride SF$_6$ or nitrogen trifluoride NF$_3$ in order to create a fluorinating atmosphere around the part while it is formed. The gas constituting the atmosphere of the enclosure serves also to confine the cylindrical part as it is being formed; this is favorable for fining the glass and for homogenizing the glass during fining.

At the start of the process of manufacturing the tube a solid glass charge 11 (initial seed mass) having the composition indicated above is introduced into the pedestal 5 at ambient temperature (see FIG. 1). The pedestal 5 is installed between the porous membranes 2 and 3.

The method in accordance with the invention proceeds in the following manner.

Figure 2:
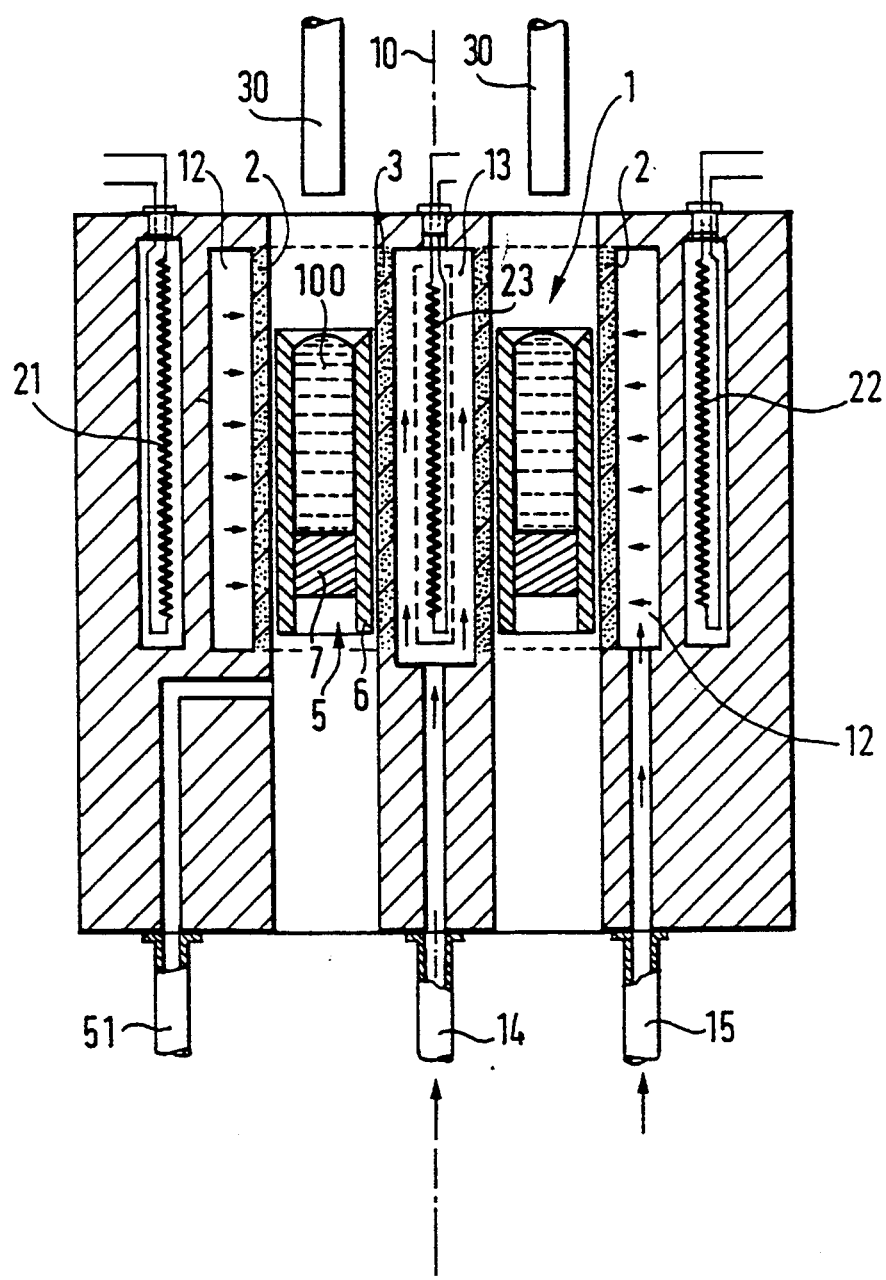

The glass charge 11 is heated by the heater resistors 21 through 23 and melts inside the pedestal at a temperature in the order of 650° C. to 700° C. FIG. 2 shows the molten charge 100.

Figure 3:
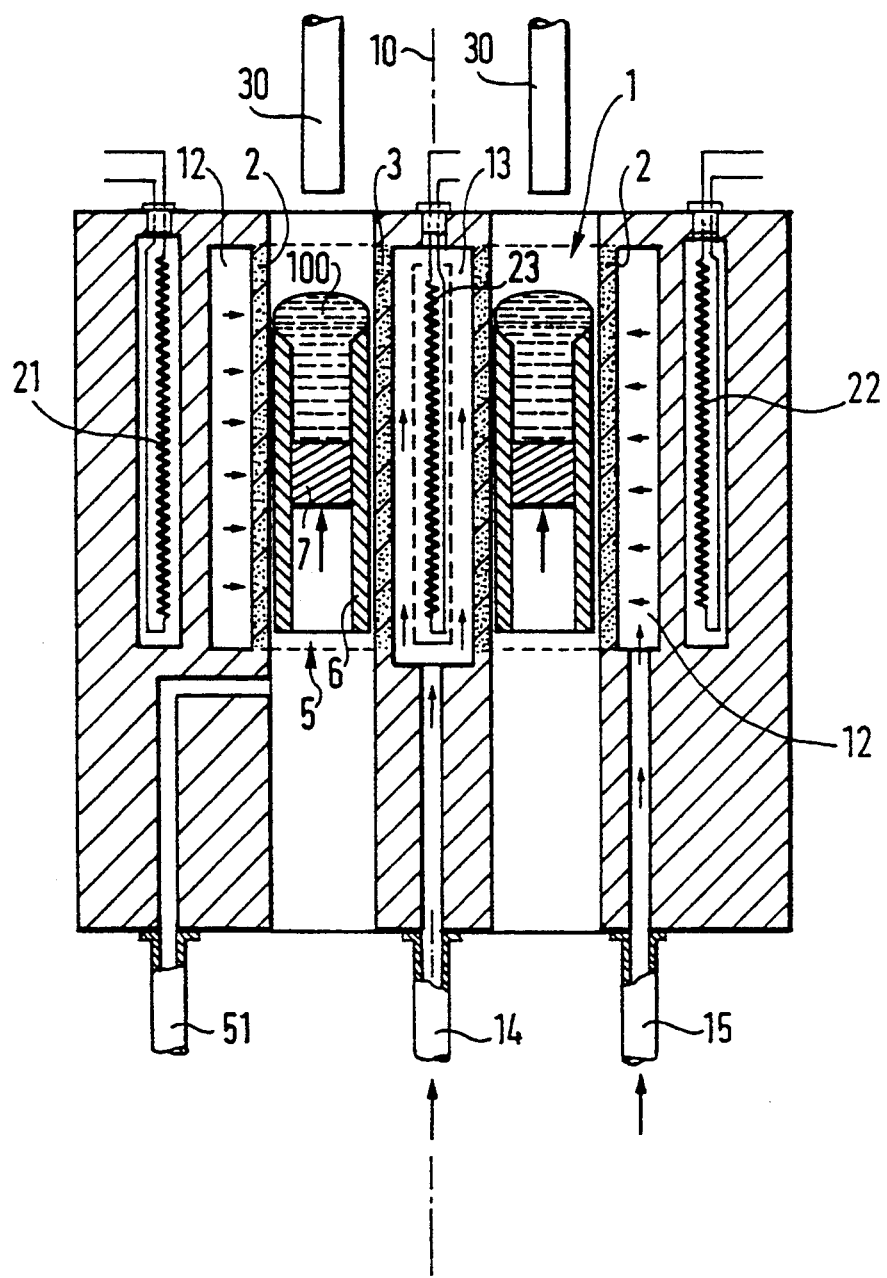
Figure 4:
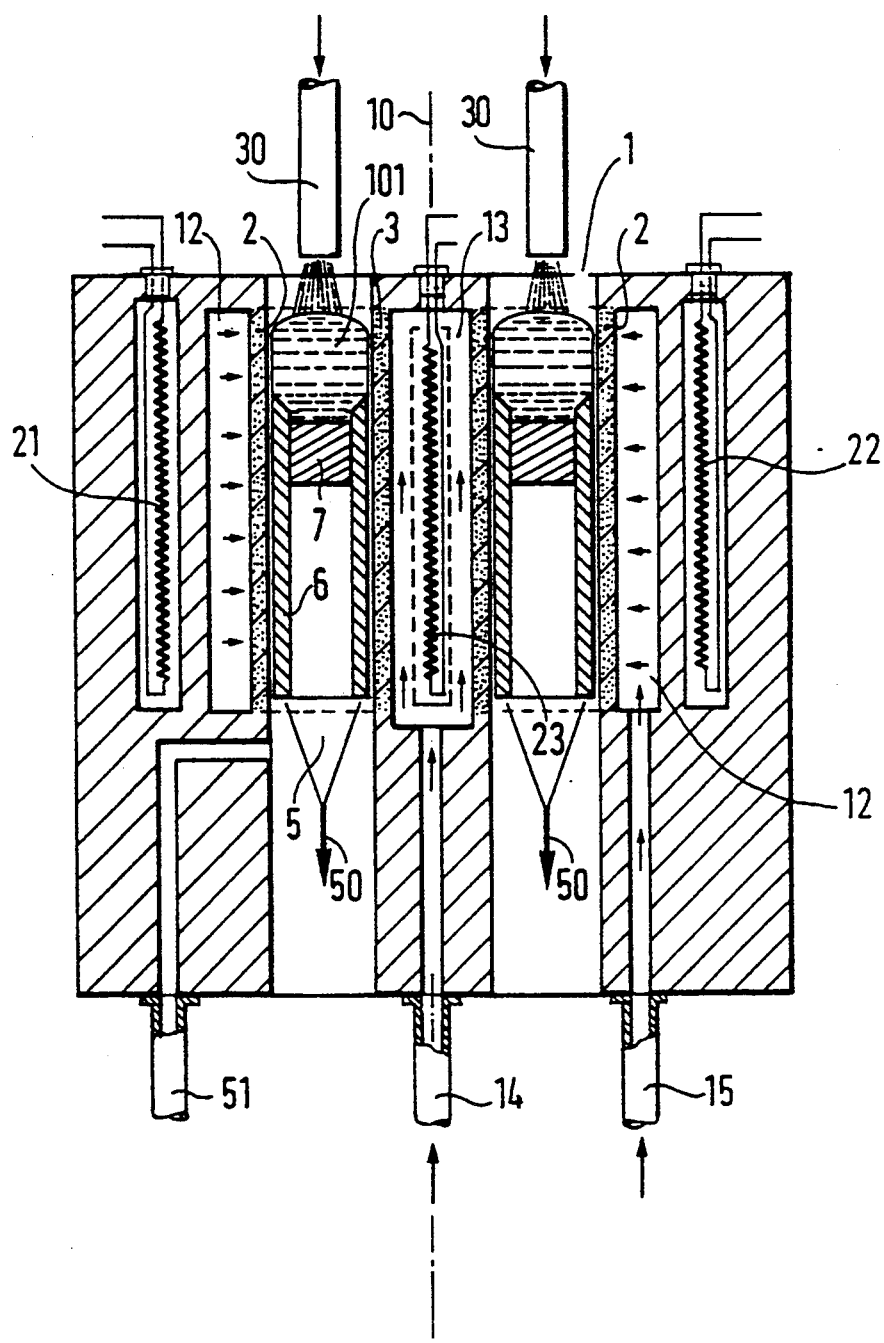

The piston 7 is then pushed upwards inside the pedestal 5 so as to produce from the molten charge 100 a molten seed mass 101 at the top of the pedestal (see FIGS. 3 and 4).

At the same time the pressures $P_1$ and $P_2$ are adjusted to a value 0.1 bar above atmospheric pressure to produce a layer of gas a few tens of microns thick between the linings 2 and 3 and the seed mass 101; a layer of gas is also maintained between the linings and the outside face of the pedestal 5. The layer of gas confines the molten seed mass 101 and prevents it coming into contact with the cavity 1.

Also at the same time, the molten seed mass 101 is fed with the powdered constituents of the glass from distribution means 30 (see FIG. 4) and the pedestal 5 is lowered (as shown by the arrows 50) at a rate of 0.5 mm/minute, for example.

Figure 5:
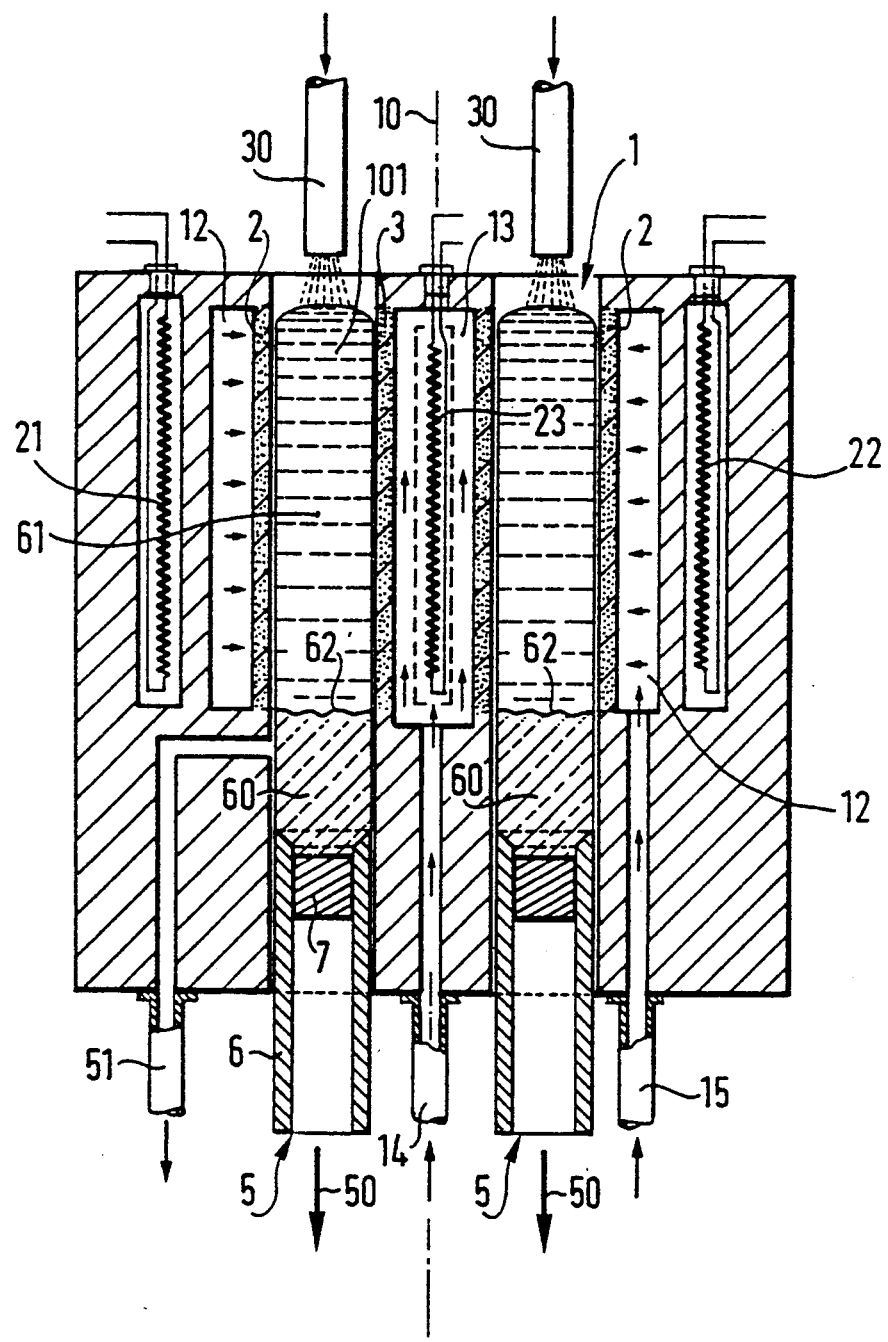
Figure 6:
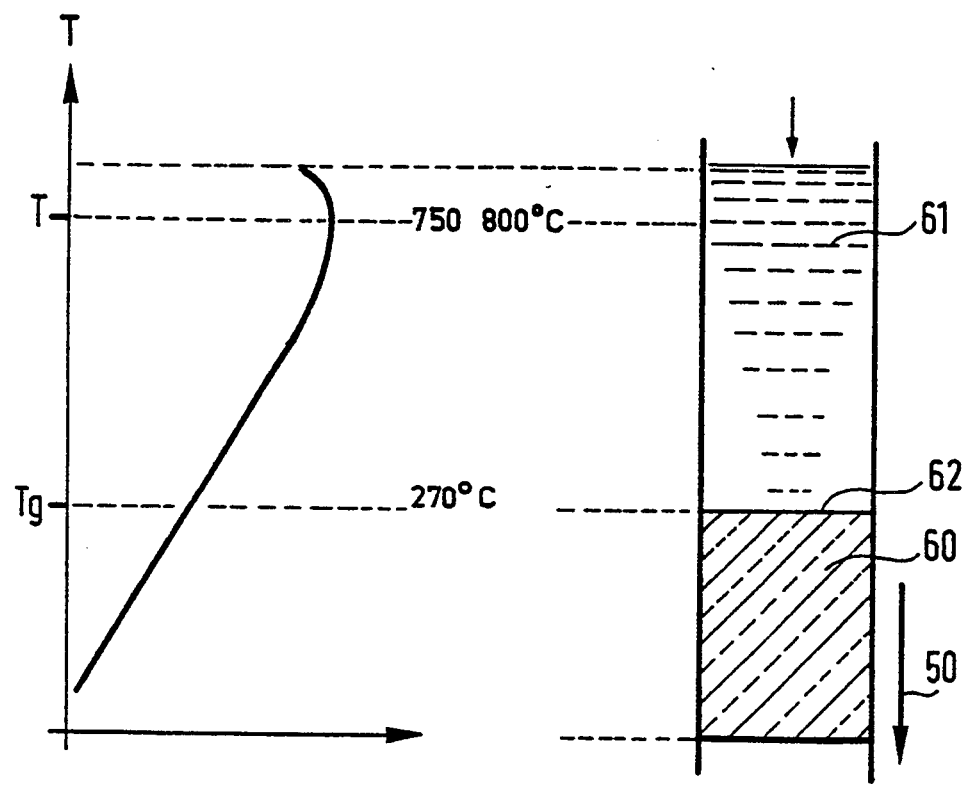
FIG. 6 shows the distribution of temperature in the tube while it is being formed.

The "steady state" after instigation of the process is shown in FIG. 5. The temperature profile along the tubular cavity is shown in the FIG. 6 diagram.

There appears a solid tube portion 60 on top of which is a column of molten glass 61. The interface 62 corresponding to the vitreous transition temperature Tg of the glass (between $-260°$ and $-270°$ C.) is substantially at the lower end of the membranes 2 and 3.

In the liquid column 61 an area very close to the upper surface is heated to a very high temperature in the order of 750° C. to 800° C. to fine the glass (i.e. to eliminate any microbubbles which may form). The size of the heating area is limited to a few millimeters in order to achieve fining without risking excessive decomposition of some fluorinated substances (see FIG. 6).

The temperature gradient in the solid tube 60 is 100° C./cm, for example. The gradient may be controlled by adding cooling systems (not shown).

A pressure sensor 51 disposed near the interface 62 is used to vary the two pressures $P_1$ and $P_2$ to adjust the pressure field in the gas film so that the height of the molten glass column 61 remains constant throughout the fiber drawing operation.

The continuous feed of powder by the distribution means 30 is of course compatible with the rate of advance. A sensor responsive to the position of the upper surface of the molten glass column may be used for this purpose.

The vertical displacement of the tube may be obtained by means of known mechanical translation systems such as the HUNTINGTON MFL-133-6 system. All operations may be controlled by a microcomputer which monitors the pressure and the speed of displacement of the tube and controls the powder flowrate.

The manufacture of a rod will now be described, for example a core rod for an optical fiber preform made from a ZBLAN type fluorinated glass with the composition (in molar percent) 54 $ZrF_4$-23 $BaF_2$-4 $LaF_3$-3 $AlF_3$-16 NaF.

Figure 7:
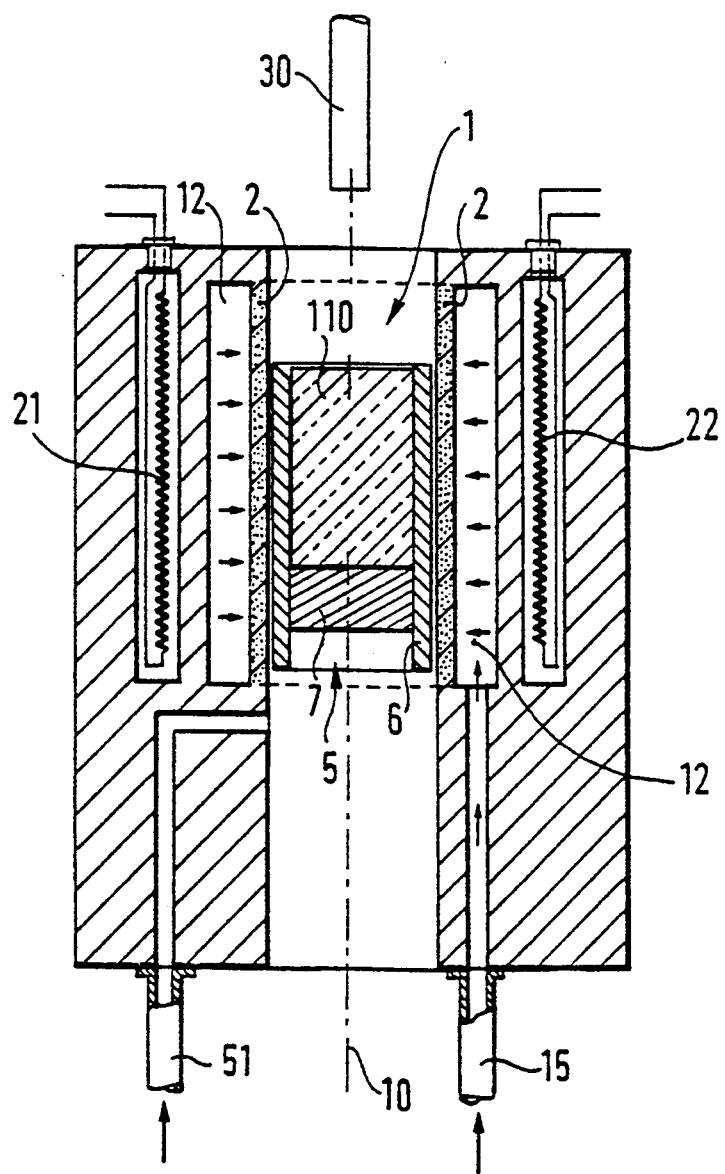
FIG. 7 is a highly schematic representation of a device utilizing the method in accordance with the invention to manufacture a rod.

A device of the same type as that described with reference to FIGS. 1 to 5 is used, but adapted to manufacture a rod. To this end the cavity 1 is a hollow cylinder rather than tubular, as shown in FIG. 7. The porous lining 3, the hollow body 13, the heating cartridge 23 and the gas feed 14 are therefore eliminated.

The device comprises a porous member 2 whose inside diameter is 15.095 mm and whose usable height is approximately 80 mm. It is machined from graphite which has a DARCY permeability of $2.7 \cdot 10^{-15} m^2$. The associated pedestal 5 is in the form of a cylindrical hollow body 6 which has a height of approximately 50 mm and an outside diameter of 15.095 mm, representing a radial clearance of 18 $\mu$m at ambient temperature between the membrane 2 and the pedestal 5. The piston 7 closing the pedestal and having the shape of a disk whose outside diameter is 9.95 mm moves inside the interior cavity of the body 6 of the pedestal 5, the diameter of this cavity being 10 mm. The pedestal 5 and the piston 7 are covered on all sides with a thin layer of pyrocarbon to improve the properties (inert nature, anti-adhesion) of the supports vis-a-vis the fluorinated glass.

An original seed mass 110 of solid fluorinated glass with a mass of approximately 9 g, a diameter slightly less than that of the interior cavity of the pedestal 5 and a height of 27 mm rests on the piston 7. The pedestal 5-piston 7-solid seed mass 110 combination is surrounded by the porous lining 2 at ambient temperature.

All the other parts of the device for manufacturing a bar are identical to those described with reference to FIGS. 1 through 5.

The entire device is installed in a tubular enclosure hermetically sealed from the atmosphere so that the work can be conducted in a controlled atmosphere. The enclosure may be purged and evacuated to eliminate residual moisture. It is also advantageous to connect the enclosure to a glovebox swept by a very dry (less than 1 ppm of water) neutral gas which is free of dust which might contaminate the glass during subsequent stages of manufacture. In this case the glass may be isolated from the atmosphere as it is introduced.

Throughout the time it takes to produce the rod the enclosure is swept at a flowrate of 2 l/min by a very pure gas mixture comprising 5% by volume of 99.97% pure sulfur hexafluoride diluted in 99.9996% pure argon and containing less than 2 ppm by volume of water and less than 5 ppm by volume of oxygen. The pressure of the confinement gas passing through the porous membrane is set throughout the duration of the operation to 120 mrods relative to the pressure inside the enclosure (close to atmospheric pressure). The confinement gas is of the same type as that used to sweep the enclosure, for example.

All the specific provisions that have just been described may be applied identically to the manufacture of a tube.

The method in accordance with the invention for manufacturing the required rod comprises the following operations.

The original seed mass 110 is introduced into the pedestal 5 surrounded by the porous lining 2.

The total flowrate of gas through the porous membrane is set to a value in the order of 0.135 l/min at ambient temperature.

The heating system (cartridges 21 and 22) is started up to heat the glass at 100° C./min until the temperature of the glass reaches 710° C. The glass constituting the original seed mass 110 is then in the molten state. It is maintained at 710° C. for approximately 15 minutes to achieve thermal equilibrium and to eliminate any gas bubbles from the gas/pedestal 5 interface. The total flowrate of the confinement gas through the porous lining is then 0.06 l/min because of the increased temperature and the resulting increased viscosity of the gas.

The piston 7 is then raised in the cavity 1 at a rate of 2 mm/min over a total height of 27 mm. The fluorinated bath consisting of the molten glass seed mass then rises slowly and is progressively extracted from the pedestal 5. It is thus confined between the walls of the porous membrane 2 without touching the latter at any time, the confined height increasing regularly. The gas film is thus formed regularly and reproducibly. The preceding operation is called the molten glass injection operation.

Once injection is completed the temperature of the bath is increased to 750° C. for the fining stage and held at this value for 15 minutes. The confined seed mass is then fed with the powder constituents of the glass from the distribution means 30 and at the same time the pedestal 5-piston 7-confined fluorinated bath combination is moved downwards at a constant speed of 2 mm/min, with the conditions for the various gas flows still the same; the glass is continuously cooled with a mean thermal gradient $-75°$ C./cm between 620° C. and 310° C., which represents a cooling rate of $-15°$ C./min in this critical temperature area where there is the risk of onset of crystallization of the glass. Cooling is completed at the rate of $-7.5°$ C./min down to the vitreous transition temperature of 260° C. before the solidified glass passes the lower end of the porous membrane 2. During the movement in translation and cooling of the fluorinated bath there is no wetting of the wall by the glass and the pressure conditions remain constant with time.

A glass rod is therefore recovered at the end of the process, in a similar way as when manufacturing tube.

Given that the stable confinement conditions do not depend to a first order on the cross-section of the liquid bath column or on its diameter(s), but on features of the porous lining(s), the pedestal-porous linings radial clearance, the pedestal height and the liquid column height, the conditions for manufacturing a glass tube are substantially the same as those for manufacturing a rod. The pedestal-membrane sets have similar values for the exterior lining and for the interior lining in the case of a tube.

The use in the method of the invention of a confining gas in preparing the glass seed mass establishes over a height of few millimeters a film of gas confining the charge and enabling manufacture to continue through continuous addition of powder.

The use of an original seed mass and possibly of the "pedestal-injector" in the method of the invention produces a highly regular gas film so that a tube or a rod can be prepared simply and reproducibly and such that the final purity depends only on the initial purity of the original fluorinated products, the reactive gases and the graphite used.

The advantage of the gas film confinement technique is that no contamination is caused by contact between the molten bath and the walls during manufacture. The absence of molds for manufacturing a tube or a rod and therefore of subsequent mechanical and/or chemical polishing of the confined surfaces further enhances the quality of the parts obtained.

The optical quality of the glass obtained may be evaluated in terms of diffusing centers (defects) precipitated within the vitreous matrix and contributing to the attenuation of the fiber produced from the tube and the rod manufactured in this way by causing losses by diffusion. The gas film confinement technique has been used to prepare samples of fluorinated glass containing a very small number of residual diffusing defects (in the order of 100 defects per cm$^3$), the size of these defects being less than one micron. This represents diffusion losses in the order of 0.015 dB/km at a wavelength of 2.55 $\mu$m. This number of defects is 10 to 100 times lower than those given in the literature (conventional methods) and the overall optical quality is similar to that of samples of Suprasil 1 which is one of the best qualities of synthetic silica of the type currently used in optical fibers.

The method in accordance with the invention can be used to manufacture a rod and a tube of fluorinated glass to produce an optical fiber preform. To this end a core glass rod having a composition (in molar percent), of 54 ZrF$_4$-23 BaF$_2$-4 LaF$_3$-3 AlF$_3$-16 NaF for example, is prepared.

In the manner previously described a cladding glass tube having a composition (in molar percent) of 53 ZrF$_4$-20 BaF$_2$-4 LaF$_3$-4 AlF$_3$-19 NaF is also prepared.

The heights of the rod and the tube may be 10 cm (but may naturally be much greater). The core glass rod has a mean outside diameter of 10.05 mm, for example, and the cladding glass tube an inside diameter of 10.00 mm and an outside diameter of 20.00 mm. These precise dimensions are obtained by an appropriate choice of the dimensions of the various parts operative in the method of the invention (porous membranes, pedestals, etc).

The rod is then inserted in the tube (this is the rod-in-tube method well known to the man skilled in the art) to obtain a preform which in this example has an index difference in the order of $5.10^{-3}$. The rod and the tube are a virtually perfect fit given their very tight tolerance dimensions resulting from the method of the invention.

All storage operations, the various glass manipulation operations and the preparation of the preform are advantageously carried out in a neutral and moisture-controlled atmosphere to prevent any deterioration by the atmosphere of the very high quality surfaces of the glass before fiber drawing.

The preform obtained in this way is transferred to a drawing tower and heated to an appropriate temperature (around 310° C., for example). The drawn fiber is homothetic to the original preform. In the above example, for a total fiber diameter of 125 $\mu$m the core has a diameter in the order of 62.5 $\mu$m. The fiber described is therefore a multimode fiber.

To prepare a monomode fiber from the above preform one possible first stage is to prepare a large intermediate fiber a few millimeters in diameter. This large fiber is then inserted into another cladding glass tube (prepared by the method of the invention or by some other conventional method as the quality of the glass is less important for the interface between the first and second cladding). This new preform yields a fiber whose core diameter is significantly reduced as compared with the initial preform. In this way monomode fibers can be obtained having core diameters of a few micrometers. They are therefore suited to telecommunications applications as low attenuation long-haul fibres and as optical amplifiers (for which purpose the core glass is doped with rare earths producing a high index difference).

The invention is naturally not limited to the embodiments that have just been described.

Specifically, the pyrocarbon layer is not essential. However, if the pyrocarbon layer is absent the fluorinated glass may adhere to the graphite and fractures may then occur during cooling because of the great difference between the coefficients of expansion of graphite ($5.10^{-6}$ C.$^{-1}$) and the ZBLAN fluorinated glass ($2.10^{-6}$ C.$^{-1}$).

Also, the various parameter values have been given by way of illustrative example only.

In particular, injection rates of 0.5 to 3 mm/min and translation speeds of 0.5 to 3 mm/min have been tried out successfully.

Likewise, graphites with permeabilities from $7.10^{-16}$ m$^2$ to $7.10^{-15}$ m$^2$ have been tried out successfully. However, it is preferable to adapt the pressure of the confinement gas to the permeability: as the permeability decreases the pressure of the confinement gas is increased.

Finally, the method of the invention is not limited to fluorinated glass or to specific shapes of the tube or the bath and any means described may be replaced with equivalent means without departing from the scope of the invention.

There is claimed:

1. Method of manufacturing a cylindrical part from glass, comprising the steps:

providing a body with an interior lining defining a vertical cylindrical cavity having an inside diameter which is a few tens of microns greater than the outside diameter of said cylindrical part, at least an upper portion of said interior lining being porous, providing a cylindrical pedestal for supporting said part as it is being formed, said pedestal having an outside diameter such that it is free to slide in said cavity, providing at the top of said pedestal an initial seed mass having a same composition as said glass, heating said initial seed mass until it melts, injecting a gas into said porous lining in order to maintain between said porous lining and said molten seed mass a layer of said gas a few tens of microns thick to thereby prevent any contact between the molten seed mass and the lining, feeding a powder having the same composition as said glass to the molten seed mass from the top of said cavity, simultaneous with the feeding, lowering said pedestal to thereby permit a lower portion of the seed mass in a lower portion of said cavity to solidify, and maintaining at least an upper portion of the seed mass in an upper portion of said cavity in a molten condition and thereby form said cylindrical part from said molten seed mass.

2. Method according to claim 1 wherein:

said pedestal is a hollow cylindrical body closed at a lower end by a piston, said method further comprises the step of removing said molten initial seed mass progressively from the inside of said pedestal by pushing said piston upwards into said hollow cylindrical body.

3. Method according to claim 2 wherein said piston is covered with pyrocarbon.

4. Method according to claim 1 wherein said pedestal slides in said cavity with a layer of gas between said pedestal and said lining.

5. Method according to claim 1 further comprising the steps:
controlling pressure of the gas in said porous lining, and
maintaining in said cavity a column of said molten seed mass having a constant height.

6. Method according to claim 1 wherein as said part is being formed, the solidified seed mass portion is surmounted by a column of said molten seed mass, a vitreous transition interface between the solidified seed mass and the molten seed mass being located adjacent a base portion of said porous lining.

7. Method according to claim 1 wherein said porous lining is made from graphite with a DARCY permeability in the order of $10^{-15}$ M$^2$.

8. Method according to claim 6 wherein said porous lining is covered with a thin pyrocarbon layer.

9. Method according to claim 1 wherein all surfaces of said pedestal are covered with a thin pyrocarbon layer.

10. Method according to claim 1 wherein:
said cylindrical part is a tube,
said cavity is tubular,
said lining comprises a plurality of coaxial porous linings, and
said pedestal is annular.

11. Method according to claim 10 wherein said coaxial linings are the same thickness and equal gas injection pressures are applied to the inside and outside of the tube being formed.

12. Method according to claim 1 wherein:
said cylindrical part is a rod.

13. Method according to claim 1 wherein said glass is fluorinated glass.

* * * * *